United States Patent [19]

Tobler et al.

[11] Patent Number: 4,751,364
[45] Date of Patent: Jun. 14, 1988

[54] APPARATUS FOR CUTTING A STRIP OR WIRE-LIKE ELECTRODE REMOVED FROM AN ELECTROEROSION MACHINE

[75] Inventors: Karl Tobler, Maggia; Rene Derighetti, Losone, both of Switzerland

[73] Assignee: AG fur Industrielle Elektronik AGIE Losone b. Locarno, Losone, Switzerland

[21] Appl. No.: 886,060

[22] Filed: Jul. 16, 1986

[30] Foreign Application Priority Data

Jul. 22, 1985 [DE] Fed. Rep. of Germany ....... 3526146

[51] Int. Cl.⁴ .......................... B23H 7/02; B21F 11/00
[52] U.S. Cl. ............................... 219/69 W; 83/926 B; 140/139
[58] Field of Search ............... 219/69 W, 68, 69 R, 219/69 E; 204/206; 140/139; 83/355, 926 B

[56] References Cited

U.S. PATENT DOCUMENTS

| | | | |
|---|---|---|---|
| 3,822,374 | 7/1974 | Ullmann et al. | 219/69 W |
| 3,912,899 | 10/1975 | Lehmann et al. | 219/69 W |
| 4,242,558 | 12/1980 | Kunze | 219/69 W |
| 4,350,864 | 9/1982 | Janicke et al. | 219/69 W |
| 4,618,761 | 10/1986 | Inoue et al. | 219/69 E |
| 4,709,130 | 11/1987 | Lodetti et al. | 219/69 W |

FOREIGN PATENT DOCUMENTS

| | | | |
|---|---|---|---|
| 56-21732 | 2/1981 | Japan | 219/69 W |
| 56-76332 | 6/1981 | Japan | 219/69 W |
| 57-61422 | 4/1982 | Japan | 219/69 W |
| 109226 | 6/1983 | Japan | 219/69 W |
| 232730 | 12/1984 | Japan | 219/69 W |
| 60-76285 | 4/1985 | Japan | 219/68 |

Primary Examiner—A. D. Pellinen
Assistant Examiner—Geoffrey S. Evans
Attorney, Agent, or Firm—Helfgott & Karas

[57] ABSTRACT

Wire cutting apparatus which includes a mechanism for conveying an electrode and cutting device having rotary cutting elements and a tender tool. A post generator is electrically connected to the cutting elements and the counter tool for purposes of supplying power to the spark erosion machine. The cutting elements are electrically insulated with respect to the drive shaft thereof and the service of the counter tool is electrically insulated relative to the mounting support thereof. Additionally, there is provided an electrical connection which constantly forces the rotary cutting elements and the counter tool to the electrical potential of the electrode.

10 Claims, 3 Drawing Sheets

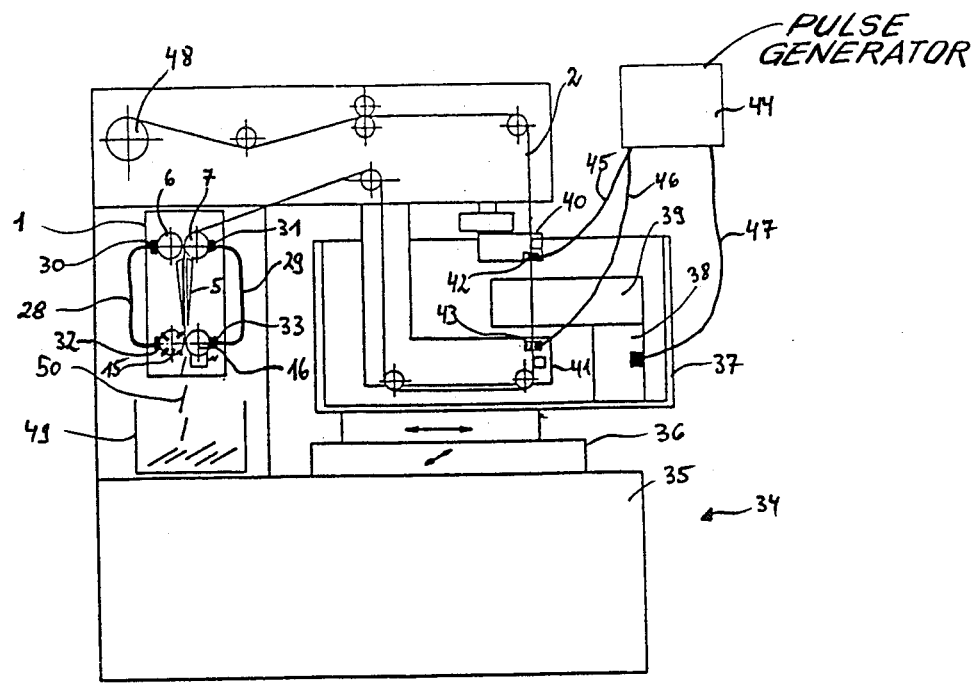
_Fig. 2_
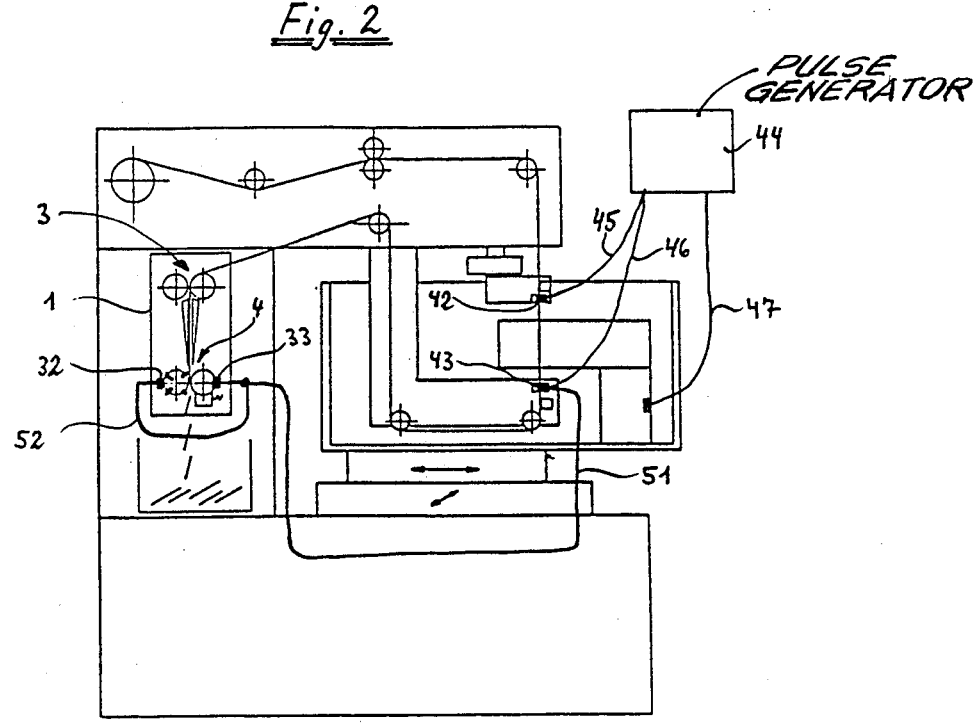
_Fig. 3_

APPARATUS FOR CUTTING A STRIP OR WIRE-LIKE ELECTRODE REMOVED FROM AN ELECTROEROSION MACHINE

BACKGROUND OF THE INVENTION

This invention relates generally to a cutting apparatus and more particularly to apparatus for cutting a strip-like or wire-like electrode that is removed from a spark erosion machine or electroerosion machine.

The electroerosion machine includes a mechanism which conveys the electrode and an electrode cutting mechanism which is comprised of rotary cutting elements and a counter-tool. The rotary cutting elements and a ring holding the cutting elements are electrically insulated with respect to the drive shaft of the machine and the counter-tool cutting surface is electrically insulated with respect to its mounting support.

Wire cutting means are known from Japanese Pat. Nos. 57-61422, 57-61423 and 58-109226, from Swiss Pat. No. 634 497 and from the unpublished German patent application No. P 35 11 930 of the present Applicant. In all the wire cutting means known from the prior art there is a common problem of the cutting elements, such as blades, very rapidly becoming worn or blunt. When this happens, the electrode is no longer cut off correctly and an accumulation occurs in the machine.

In order to solve this problem, it is suggested in Swiss Pat. No. 634 497 to construct the cutting tool and the counter-tool in a special way and, specifically, as a polygonal bit which cooperates with an anvil, so that the electrode is notched instead of being cut. However, cutting tools made in accordance with the teaching of the Swiss patent became worn to an extent that was not acceptable for continuous automatic operation.

It would appear obvious to manufacture the cutting tool or blades from a wear-resistant, electrically non-conductive material such as a ceramic material. However, this class of material is very difficult to work and, as a result, the blades become very expensive.

SUMMARY OF THE INVENTION

The primary object of the present invention is to so improve the wire cutting means of the aforementioned type so that its cutting tool has a much longer service life.

According to the present invention, the problem encountered by prior art structure is solved by an electrical connection, which constantly keeps the rotating cutting elements or the ring holding the rotating cutting elements and the counter-tool at the same electrical potential as the electrode. Thus, cutting tool wear is reduced by means of an electrical measure.

The solution provided by the present invention is based on the observation that the wear to the cutting tools in known wire cutting means results from an electroerosion process. The wire or strip-like electrode that is removed from the electroerosion machine is still subjected to a pulse-like electric voltage, which is required during electroerosion. Because the electrode is not constantly in contact with the cutting elements or the blades of the cutting mechanism, there is an electric discharge (possibly even with spark production) shortly before contact takes place between the electrode and the individual cutting element. This leads to an electro-erosive removal of material from the cutting element.

This effect also occurs with the wire cutting means of Japanese Pat. No. 57-61422, where the cutting elements and the roller serving as the counter-tool are mounted in an insulated manner, so that higher electrical currents cannot flow. However, these elements have a self-capacitance that is not neglibible, thereby leading to a charging or discharging current in the event a voltage is supplied through the electrode.

BRIEF DESCRIPTION OF THE DRAWINGS

The present invention is described in greater detail hereinafter in conjunction with the attached drawings, wherein like reference characters designate like parts. In the drawing:

FIG. 2 is a schematic illustration of an electroerosion machine including the wire cutting means according to the first embodiment shown in FIG. 1; and FIG. 3 is a schematic illustration of an electroerosion machine similar to the one shown in FIG. 2, but with a wire cutting means according to a second embodiment of the present invention.

DETAILED DESCRIPTION OF THE PREFERRED EMBODIMENTS

Figure 1:
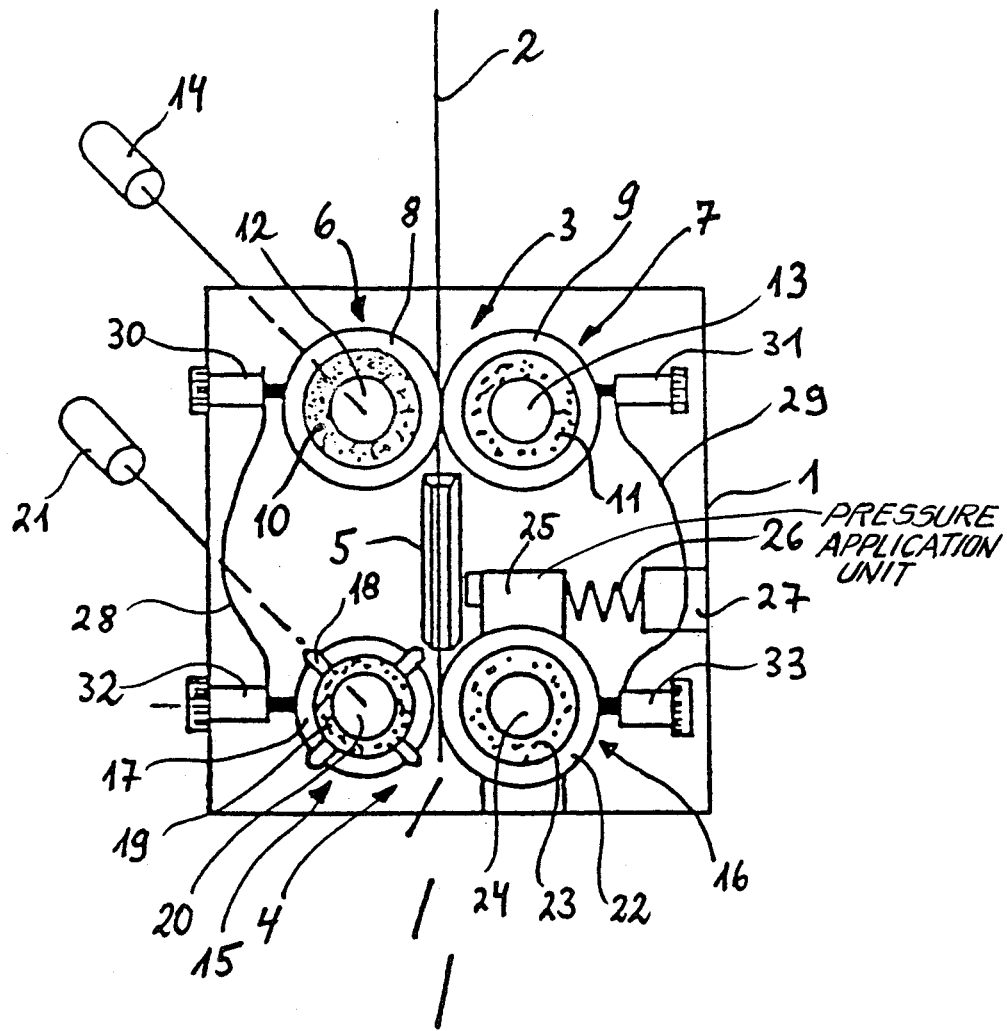
FIG. 1 is a schematic illustration of the wire cutting means according to a first embodiment of the present invention.
Figure 1A:
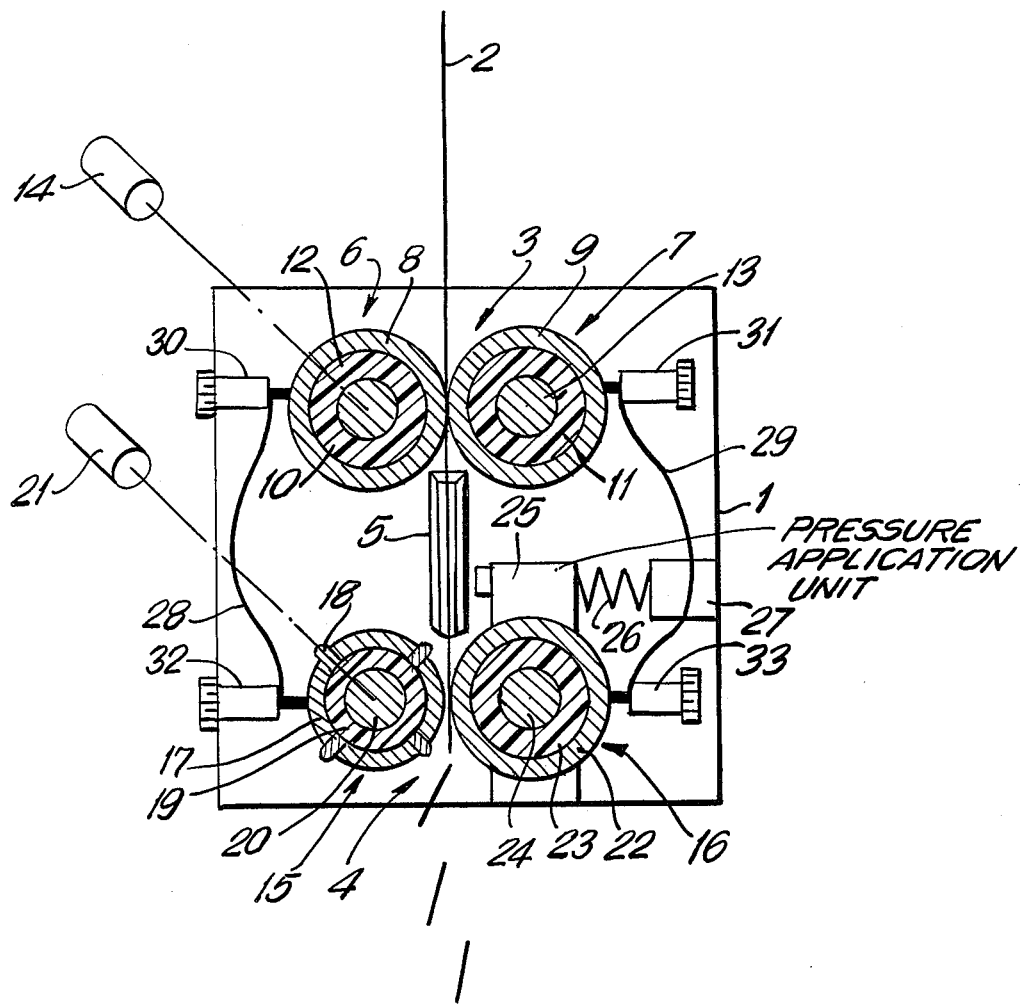
FIG. 1a is a view similar to FIG. 1 but illustrating the electrical insulation of certain parts.

The wire cutting means generally designated by the reference character 1 of FIGS. 1 and 1a is intended to cut the wire or strip-like electrode 2 into short portions or lengths. Except when there is a break in the wire in the electroerosion machine, the electrode 2 is subjected to the action of a pulse-like voltage. The electrode 2 is removed from the electroerosion machine by means of a conveying mechanism 3 and is supplied to a cutting mechanism 4. A wire guide 5, which can be a tube, is provided between the conveyor mechanism 3 and the cutting mechanism 4. In the first embodiment of the present invention illustrated in FIGS. 1 and 1a, the conveyor mechanism 3 comprises two conveyor rollers or pulleys 6 and 7 between which passes the electrode 2. Each of the two conveyor rollers or pulleys 6 and 7 has an outer ring 8 and 9, respectively, made from an electrically conductive material, such as for example, a high-grade steel. Each of the outer rings 8 and 9 is insulated by means of an insulating ring 10 and 11, respectively, with respect to a shaft 12 that drives the roller 6 and a pivot pin or stud 13 on which the roller 7 is mounted. The drive shaft 12 of the pulley 6 is driven by a motor 14. The conveyor pulley 6 drives the conveyor pulley 7 by means of a frictional grip. Outer rings 8 and 9 corresponding conveyor pulleys 6 and 7 are elastically biased or urged against one another by clamping devices (not shown), so that both of them press against the electrode 2. Thus, both the outer rings 8 and 9 are at the same electrical potential as the electrode 2. Thus, the remaining supporting structures, including mounting arrangements, of pulleys 6 and 7 are insulatedly separated from corresponding rings 8 and 9 by the corresponding insulating rings 10 and 11.

In the embodiment of this invention illustrated in FIGS. 1 and 1a the cutting mechanism 4 comprises a cutting tool 15 and a counter-tool 16. The cutting tool 15 has an outer ring 17, on the circumferential surface of which are mounted several cutting elements 18. The ring 17 and the cutting elements 18 are made from an electrically conductive material such as steel, for example, and are consequently electrically connected to one another. The ring 17 is insulated by insulation material 19 from a drive shaft 20 therefor, which is, in turn, driven by a motor 21.

The counter-tool 16 is constructed as a roller or pulley which, like the conveyor pulleys 6 and 7, comprises an outer ring 22, a layer of electrical insulation material 23 and a pivot pin or stud 24. The pulley or counter-tool 16 is also driven by the motor and also, for example, by a gear train (not illustrated) that extends between and couples the drive shaft 20 and the pivot pin 24 by a V-belt and pulley arrangement or in any other known way.

The drive shaft 20 is rigidly mounted in the embodiment illustrated, whereas the counter-tool 16 is displaceably mounted. A pressure application unit 25, which by means of a spring 26 that is mounted on a support 27 on the casing of the wire cutting means, presses the counter-tool 16 in the direction of the cutting mechanism 15 up to a suitable stop. Thus, when loaded by the cutting elements 17, the counter-tool 16 can give way, so that only the force necessary for the actual cutting occurs between the cutting elements 18 and the counter-tool 16. Instead of the illustrated mounting, the individual cutting elements can also be displaceably mounted with respect to the ring 17, as disclosed in Japanese Pat. No. 58-109226.

In the first embodiment of this invention a shown in FIGS. 1 and 2, the cutting tool 15 and the counter-tool 16 are electrically connected to the conveyor pulleys 6 and 7 by electrical connections 28 and 29, respectively, and are consequently constantly forced to the electrical potential of the electrode 2. The electrical connections 28 and 29 are electric cables, which are connected to sliding contacts that are in the form of brushes 30, 31, 32 and 33, which slide on the electrically conductive rings 8, 9, 17 and 22. The conveyor roller 6 is electrically connected to the ring 17 holding the cutting elements 18 and the conveyor roller 7 to the counter-tool 16 and its ring 22.

The embodiment of the present invention that is illustrated in FIG. 1 has the additional advantage that the wire cutting means 1, or its parts, coming into contact with the electrode 2 are only subject to the action of a voltage if, in the vicinity of the working zone of the electroerosion machine, the electrode 2 is live and is not broken or interrupted between the working zone and the wire cutting means 1. However, if the electrode 2 is broken at a location down-stream of the working zone, the wire cutting means 1 is potential-free.

As a result of the use of the described electrical cables 28 and 29, all parts of the cutting mechanism 4 which either constantly or periodically come into contact with the wire, for example the cutting elements 18, are forced to remain a the electrical potential of the electrode 2, so that there can be no potential of the electrode 2, so that there can be no potential differences and therefore no electrerosion processes.

FIG. 2 schematically illustrates an electroerosion machine generally designated by the reference character 34 utilizing the wire cutting means shown in FIG. 1. The machine 34 has, in a well known manner, a column 35 with a compound slide 36, to which is fixed a container 37 for the working medium required during erosion. The workpiece 39 that is to be cut by the electrode 2 is mounted on a work holding device 38 which is connected to the container 37. On either side of the workpiece 29, the electrode 2 is guided in an upper and a lower wire guide head 40 and 41, respectively, where it is supplied via current feed means 42 and 43 with electric power from a pulse generator 44. Thus, both of the current feeds 42 and 43 are connected across lines 45 and 46 to the pulse generator 44. In addition, either the workpiece 39 or the work holding device 38 is connected, via an electric line 40, to the other pole of the pulse generator 44. The electrode 2 is unwound from a wire spool 48, conveyed via several conveyor and guide pulleys to the upper wire guide head 40, passes from there through the working zone to the lower wire guide head 41 and from there, via further conveyor guide pulleys, to the wire cutting means 1. It is more clearly visible with respect to the machine according to Fig.2 that a wire break that is located down-stream of the working zone makes the wire cutting means 1 potential-free, so that the free ends of the electrode 2 cannot cause short-circuits. The cut off wire portions fall into a collecting container 29 arranged below the wire cutting means 1.

In the embodiment of the present invention illustrated in FIG. 3, the cutting mechanism 4 is subjected to the action of the potential of electrode 2 in another way. Unlike the embodiments according to FIGS. 1 and 2, this does not take place via the actual electrode, but through other electrical connections 51 and 52. The cutting tool 15 and counter-tool 16 are electrically interconnected via the sliding contacts 32 and 33 and an electric line 52. In addition, the electric line 52 is directly connected to the pulse generator 44 by means of an electric line 51. In the second embodiment of the present invention, this latter connection is brought about because the electric line 51 is connected to the current feed 43 of the lower wire guide head 41 and is consequently connected via the line 46 to the pulse generator 44.

This second embodiment of the invention has the advantage that the electric potential of the cutting mechanism 4 is independent of the transfer resistance between the electrode 2 and the two conveyor pulleys 6 and 7. However, it suffers from the disadvantage that, in the event of an electrode break, that part of the electrode 2 that is down-stream of the break is also live. Therefore, in this second embodiment, it is very important to immediately switch off the pulse generator 44 if the electrode 2 breaks. This is, in any case, generally carried out in most electroerosion machines.

As is immediately apparent the invention can also be used on electroerosion machines and wire cutting means in which several, parallel electrodes are used. These are socalled multichannel machines. It must be ensured however that the individual "channels" are electrically insulated against one another. Thus, the parallel parts of the conveying and cutting mechanisms arranged parallel to one another on one axis are electrically interconnected in a channel-like manner, in the way in which it has been described in connection with the previously illustrated embodiments.

What is claimed is:

1. A wire cutting means for cutting a wire-like or strip-like electrode that is removed from an electroerosion machine by means of the combination of a mechanism which conveys the electrode and a cutting mechanism which includes rotary cutting elements and a counter-tool which are electrically connected directly by means of an electrical connection to a pulse generator that supplies power to a spark erosion machine, the rotary cutting elements being electrically insulated with respect to the drive shaft of the rotary cutting mechanism and the surface of the counter-tool is electrically insulated relative to the mounting support thereof, comprising, in combination therewith an electrical connection which constantly forces the rotary cutting elements and the counter-tool to the electrical potential of the electrode.

2. The wire cutting means according to claim 1, wherein the cnveyor mechanism is constructed as a pair of conveyor pulleys, wherein the conveyor pulleys are electrically insulated with respect to their own mounting means and wherein the electrical connection connects the conveyor pulleys to the rotary cutting elements and the counter-tool.

3. The wire cutting means according to claim 2, in which the counter-tool is a rotating roller, and wherein the electrical connection is brought about by means of sliding contacts and electrical lines connected thereto.

4. The wire cutting means according to claim 1, wherein the cutting elements and the counter-tool are electrically connected directly be means of an electric connection to a generator supplying power to the spark erosion machine.

5. The wire cutting means according to claim 4, wherein the electrical connection is connected to a current feed by means of which the electrode is supplied with electric power for the electroerosion process.

6. The wire cutting means according to claim 4, wherein the generator is a pulse generator.

7. The wire cutting means according to claim 1, wherein the cutting mechanism is adapted for cutting several parallel electrodes and wherein the cutting elements and counter-tool for each electrode are insulated against the other cutting elements and counter-tools for the other electrodes and are electrically brought to the potential of the individually supplied electrode.

8. A wire cutting means for cutting wire-like or strip-like electrode that is removed from an electrode-erosion machine by means of a combination of a mechanism which conveys the electrode and a cutting mechanism which includes rotary cutting elements and a counter-tool which are electrically connected directly by means of an electrical connection to a post generator that supplies power to the spark erosion machine, said conveyor mechanism being constructed as a curve conveyor wherein the conveyor pulleys are electrically insulated with respect to their own mounting means with one of the conveyor pulleys being electrically connected directly to the ring holding the cutting elements by means of the combination of an electric line and sliding contact and wherein the other conveyor pulley is electrically connected directly to a rotating ring of the counter-tool by means of a further electric line and sliding contacts, the counter tool being a rotating roller, the rotary cutting elements being electrically insulated with respect to the drive shaft of the rotary cutting mechanism and the surface of the counter-tool is electrically insulated relative to the mounting surface thereof, comprising, in combination therewith, an electrical connection which constantly forces the rotary cutting elements and the counter-tool to the electrical potential of the electrode, the electrical connection connecting the conveyor pulleys to the rotary cutting elements and the counter-tool, the electrical connection being brought about by means of sliding contacts and electrical lines connected thereto.

9. A wire cutting means according to claim 8 wherein the electrical connection is connected to a current feed by means of which the electrode is supplied with electric power for the electroerosion process.

10. The wire cutting means according to claim 8 wherein the cutting mechanism is adapted for cutting several parallel electrodes and wherein the cutting elements and the counter-tool for each electrode are insulated against the other cutting elements and the other counter-tools for the other electrodes and are electrically brought to the potential of the individually supplied electrode.

* * * * *